A. HOCHSTEIN.
Harrow.
No. 79,829.
Patented July 14, 1868.
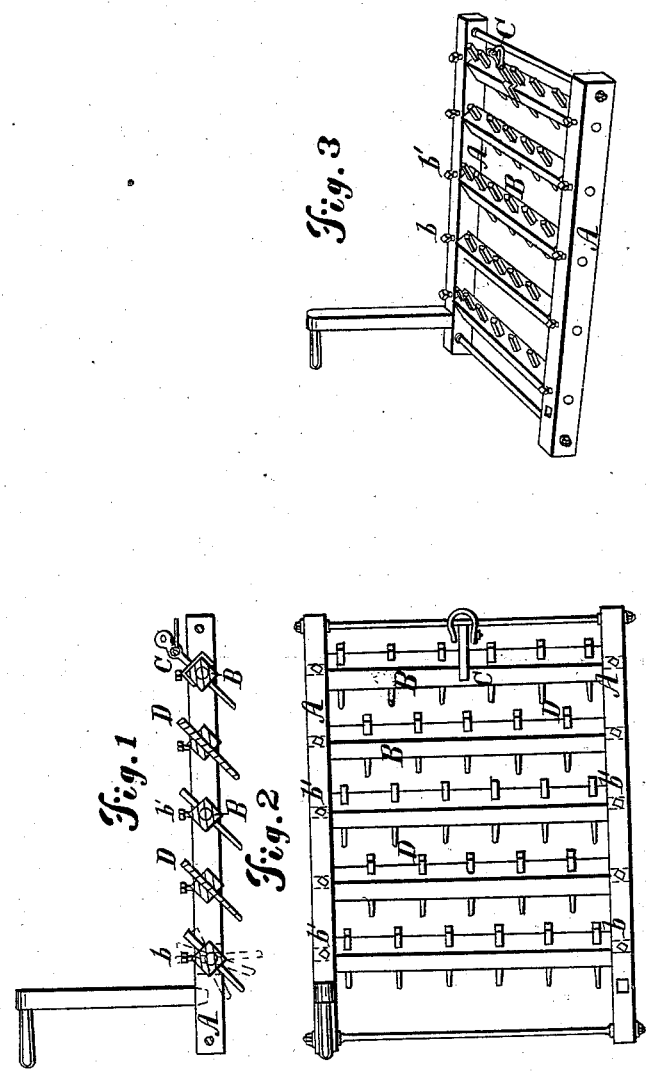

United States Patent Office.

ANTHONY HOCHSTEIN, OF WILLIAMSVILLE, NEW YORK.

Letters Patent No. 79,829, dated July 14, 1868.

IMPROVEMENT IN HARROWS.

The Schedule referred to in these Letters Patent and making part of the same.

TO ALL WHOM IT MAY CONCERN:

Be it known that I, ANTHONY HOCHSTEIN, of Williamsville, in the county of Erie, and State of New York, have invented a certain new and useful Improvement in Harrows; and I do hereby declare that the following is a full and exact description thereof, reference being had to the accompanying drawings, making a part of this specification, in which—

Figure I is a longitudinal vertical section.

Figure II is a top plan view.

Figure III is a perspective view.

The nature of this invention consists in placing and supporting the teeth of a harrow in adjustable or hinged cross-beams, adjusted by means of set-screws, so that the harrow-teeth may be used upon different angles, and the harrow thereby be better adapted to the purposes for which it is used.

Letters of like name and kind refer to like parts in each of the figures.

My improved harrow is composed of two main beams and a number of cross-beams, to which the teeth are connected.

The main beams A are parallel to each other, and also parallel to the line of motion of the harrow, the point of attachment of the draught animals being upon one of the end cross-beams B, equidistant from both the main beams A, as shown at C.

D D represent the teeth of my improved harrow. They are arranged in appropriate mortises in the cross-beams or ribs B, and supported by the said cross-beams.

Both ends of each cross-beam are journalled or made cylindrical, and fitted into circular openings made in the main beams A, in such manner that the cross-beams may be revolved in said openings or bearings, and thereby change the angle of the working position of the teeth, as may be desired, to accommodate the harrow to the different conditions of the ground.

$b'$ $b'$ represent set-screws, which pass through the main beams, above the bearings of the cross-beams, and serve the purpose of firmly holding the latter in any desired position.

The object of this invention is to better adapt a harrow to the particular kind of work it is to perform.

For instance: for covering timothy, turnips, and garden seeds, the teeth of the harrow should be adjusted at an angle of about twenty to thirty degrees.

An angle of about forty-five to fifty degrees is the best position of the teeth, when the harrow is used for breaking rough ground, for, instead of allowing the large lumps of earth to be moved sidewise, and pass between the teeth unbroken, the slanting teeth will take hold of and cut the lumps into small pieces. Some of the cross-beams may be adjusted at one angle and some at another.

Hence it will be readily seen that this improved harrow takes the place of several harrows of different construction, adapted for the different purposes for which they are used.

What I claim as my invention, and desire to secure by Letters Patent, is—

The combination of the adjustable teeth-supporting beams B, independent of each other, and the set-screws $b'$ $b'$, substantially as and for the purpose described.

ANTHONY HOCHSTEIN.

Witnesses:
  B. H. MUEHLE,
  EDW. WILHELM.